United States Patent Office 2,786,670
Patented Mar. 26, 1957

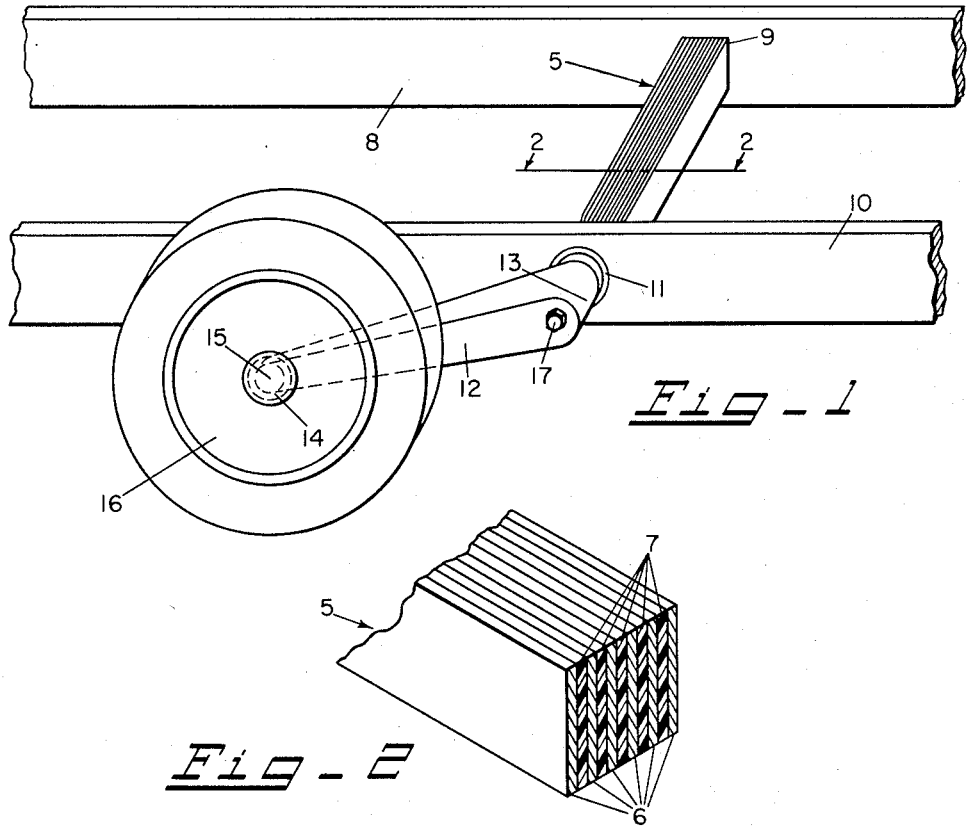

2,786,670

LAMINATED TORSION SPRING ELEMENT

Milton B. Hammond, Edgeworth, Pa., assignor to Rockwell Spring and Axle Company, Coraopolis, Pa., a corporation of Pennsylvania Application March 14, 1955, Serial No. 493,893

5 Claims. (Cl. 267—57)

This invention relates to torsion spring elements. More particularly, it relates to laminated torsion springs in which leaves of a resin or a rubber are laminated among leaves of spring steel.

In the past, torsionally resilient members have received wide-spread use. In vehicle suspension systems, these members are conventionally in the form of round, solid bars. This configuration, however, does not allow fine control over the spring characteristics of the torsionally resilient member. More recently, torsion plate springs and laminated pairs of such plates have been used in an effort to provide better spring characteristics.

It is an object of the present invention to provide a torsionally resilient member whose configuration allows close control of its resilient and damping characteristics.

It has been suggested that pairs of plates be laminated in order to provide improved torsion spring elements. But because of the necessary relative movement of the leaves or plates of such an element during torsion, friction generated therebetween creates problems of wear and noise.

It is another object of the present invention to provide a laminated torsion spring element whose configuration prevents undue friction between the leaves of the laminate.

Also, in the past, torsion plate springs have been pretwisted in order to provide a more varied adjustment of spring properties. Pairs of such plates have been initially twisted in the opposite or the same direction and then assembled as a laminate in order to further adjust spring properties. However, in pretwisting a laminated stack of leaves after their assembly as a laminate, special problems arise and special results are possible. When the several leaves are initially twisted as a group, there exists a relative sliding action between leaves. A substantial initial twist produces relatively more such sliding than would be encountered in the normal operation of such a torsion spring element.

It is a further object of the present invention to provide a laminated torsion spring element in which the leaves of the element can be beneficially pretwisted as a group despite the sliding effect between the leaves.

It is an additional object to provide a laminated torsion spring element whose configuration allows adjustment of spring properties in a multitude of ways.

In the drawings:

Fig. 1 is a perspective view of a portion of a vehicle frame or chassis equipped with a torsion spring suspension constructed according to the present invention.

Fig. 2 is a perspective view, showing a section through 2—2 of Fig. 1, of a laminated torsion spring element constructed according to the present invention.

Fig. 3 is a perspective view, partly in section, of a similar element which has been pretwisted.

The specific suspension of Fig. 1 is shown as an example only, since torsion spring elements constructed according to the present invention may be used with equal facility in any type of vehicle suspension employing a torsionally resilient spring. The spring element 5 of Fig. 1, with reference to the more detailed showing of Fig. 2, comprises metal leaves 6, preferably composed of steel, and leaves of a resin or rubber 7, which are alternately and intermediately laminated with the metal leaves 6. The cross section of the element 5 shown is rectangular, but the precise shape of the cross section may be varied.

With reference to Fig. 1, the spring element is rigidly secured to the frame member 8 in their intersection 9, as by bolting or clamping, along a small portion of the length of the spring element 5. The element 5 is bearing-supported in the frame member 10 at a substantial distance from the intersection 9 by bearing 11. The bearing 11 is mounted in the frame member 10, and the element 5 is rigidly attached as by bolting or clamping through the center of the bearing 11 the arm 12 is rigidly attached, as by bolting or clamping, to the element 5 near its bearing-supported end 13. The arm 12, at its other end, supports by a bearing 14 the axis 15 of the wheel 16, thereby providing a wheel assembly. In operation, translation of the axis 15 causes rotation of the arm 12 about the axis 17 of the torsion spring element 5. Since the element 5 is torsionally resilient, restoring forces tend to return the arm 12 to its natural position, whereby the wheel 16 is resiliently engaged to the vehicle frame.

Fig. 3 shows an embodiment of the present invention in which the laminated torsion spring element 5' has been given an initial permanent twist. The pretwisting takes place after the laminate has been constructed. As shown, the spring element comprises metal leaves 6' alternately and intermediately laminated with leaves of a resin or rubber 7'. In this embodiment also, the precise shape of the cross section may be varied.

It is known that the damping properties of a torsionally resilient member are improved if the member comprises materials with different resilient characteristics. According to the present invention, nonmetals such as resins and rubbers may be interlaminated with leaves of a metal in such manner as to provide improved damping action. In addition, the use of a resin or a rubber as a spacer material allows great control over the resiliency characteristics of the torsion spring element.

Polyethylene is an example of a material which may be used very advantageously as such a spacer material. A superior torsion spring may be made according to the present invention by laminating alternate leaves of spring steel and polyethylene to form a laminated bar having substantially a rectangular cross section. Such polyethylene spacers, in addition to modifying the spring characteristics of the torsion spring element, serve to reduce friction and wear between the several steel leaves of the torsion spring and correspondingly increase the life of the spring. At the same time, squeaks and other noises are eliminated.

Rubber may also be used advantageously as a spacer material to improve the self-dampening affect of a torsion spring element as it is put into torsion and allowed to rebound. Steel and rubber, for example, have different rates of deflection and different frequencies of oscillation. Thus, damping characteristics may be adequately adjusted by setting the configuration of the laminated bar in the proper manner.

In the construction of a laminate according to the present invention, satisfactory spring elements are obtained where the metal leaves are coated with a resin or a rubber prior to assembly. In fact, in order to obtain the desired spring properties for some purposes, the nonmetal portions of the laminated element are required to be so thin that the method of coating prior to assembly is a preferred method of making such a laminate.

An especially useful torsion spring element is obtained when the leaves of the laminate are twisted as a group after assembly to provide an initial permanent twist. As pointed out, the use of alternate leaves of a resin or a rubber in the laminated spring element allows such a pretwisting to be accomplished with no detrimental effects. The direction relative to the load in which the spring is initially twisted would of course depend upon the spring characteristics desired. The combination of (1) the lamination of different materials and (2) a pretwisting of such a laminate as a whole provides a configuration allowing exceptionally close control of its resilient and damping characteristics.

It will be understood, of course, that while the forms of the invention herein shown and described constitute the preferred embodiment of the invention, it is not intended herein to illustrate all of the possible and equivalent forms or ramifications of the invention. It will also be understood that the words used are words of description, rather than of limitation and that various changes, such as changes in shape, relative size, and arrangement of parts, may be substituted without departing from the spirit or scope of the invention herein disclosed.

What is claimed is:

1. A vehicle suspension system comprising a frame member, a wheel assembly, and a laminated torsion spring element rigidly attached along a small portion of its length to said frame member and pivotally mounted for movement about its longitudinal axis in said frame member at a substantial distance from said rigid attachment, said wheel assembly being rigidly attached to said spring at a point near the pivotally mounted portion of said spring, characterized by said spring comprising metal leaves alternately interlaminated with nonmetal leaves.

2. The vehicle suspension system of claim 1 in which the nonmetal leaves of the spring element are composed of a material selected from the group consisting of resins and rubber.

3. The vehicle suspension system of claim 1 in which the nonmetal leaves of the spring element are composed of polyethylene.

4. The vehicle suspension system of claim 1 in which the laminated torsion spring element is characterized by a substantially rectangular cross section throughout its length.

5. The vehicle suspension system of claim 1 characterized by the laminated torsion spring element having a permanent twist about its longitudinal axis to adjust the spring characteristics.

References Cited in the file of this patent

UNITED STATES PATENTS

| | | |
|---|---|---|
| 1,532,565 | Winestock | Apr. 7, 1925 |
| 1,967,038 | Geyer | July 17, 1934 |
| 2,155,073 | Ziska | Apr. 18, 1939 |
| 2,238,380 | Almen | Apr. 15, 1941 |
| 2,667,347 | Jacobs | Jan. 26, 1954 |

FOREIGN PATENTS

| | | |
|---|---|---|
| 625,864 | Great Britain | July 5, 1949 |
| 660,443 | Great Britain | Nov. 7, 1951 |